United States Patent [19]

Stasch et al.

[11] Patent Number: 4,654,771
[45] Date of Patent: Mar. 31, 1987

[54] SWITCHED POWER SUPPLY COMPRISING A FREE-RUNNING FLOW CONVERTER AND ELECTRICALLY SEPARATED CONTROL LOOP

[75] Inventors: Harald Stasch, Neuried; Rudolf Schierjott, Munich, both of Fed. Rep. of Germany

[73] Assignee: Siemens Aktiengesellschaft, Berlin and Munich, Fed. Rep. of Germany

[21] Appl. No.: 762,515

[22] Filed: Aug. 5, 1985

[30] Foreign Application Priority Data

Aug. 7, 1984 [DE] Fed. Rep. of Germany ....... 3429064

[51] Int. Cl.⁴ .......................................... H02M 3/338
[52] U.S. Cl. ....................................... 363/19; 363/37
[58] Field of Search ....................... 363/18, 19, 37, 97; 331/112; 323/266, 271, 282, 284

[56] References Cited

U.S. PATENT DOCUMENTS

| 4,328,537 | 5/1982 | Schmidtner et al. | 363/97 |
| 4,378,585 | 3/1983 | Bete | 363/19 |
| 4,443,838 | 4/1984 | Yamada | 363/19 |
| 4,573,112 | 2/1986 | Numata et al. | 363/19 |

FOREIGN PATENT DOCUMENTS

| 2919905 | 11/1980 | Fed. Rep. of Germany. | |
| 155445 | 12/1979 | Japan | 363/19 |
| WO82/01627 | 5/1982 | World Int'l Appl | 363/19 |

OTHER PUBLICATIONS

"Schaltnetzteile" by Joachim Wustehube, 1979, Expert-Verlag, Chapter 2.1.

Primary Examiner—William H. Beha, Jr.

[57] ABSTRACT

A switched power supply has a rectifier arrangement for generating a DC voltage from an input AC voltage. A converter arangement in the power supply has a switching transistor and a transformer. The converter arrangement is designed as a free-running flow converter, whereby the switching transistor is switched on in the current-free condition. A control stage with an electrically separated control loop is provided at the secondary side, whereby the control stage acquires the deviation of an output DC voltage from a prescribed value and sets the pulse duty factor for the switching transistor via the control loop.

8 Claims, 1 Drawing Figure

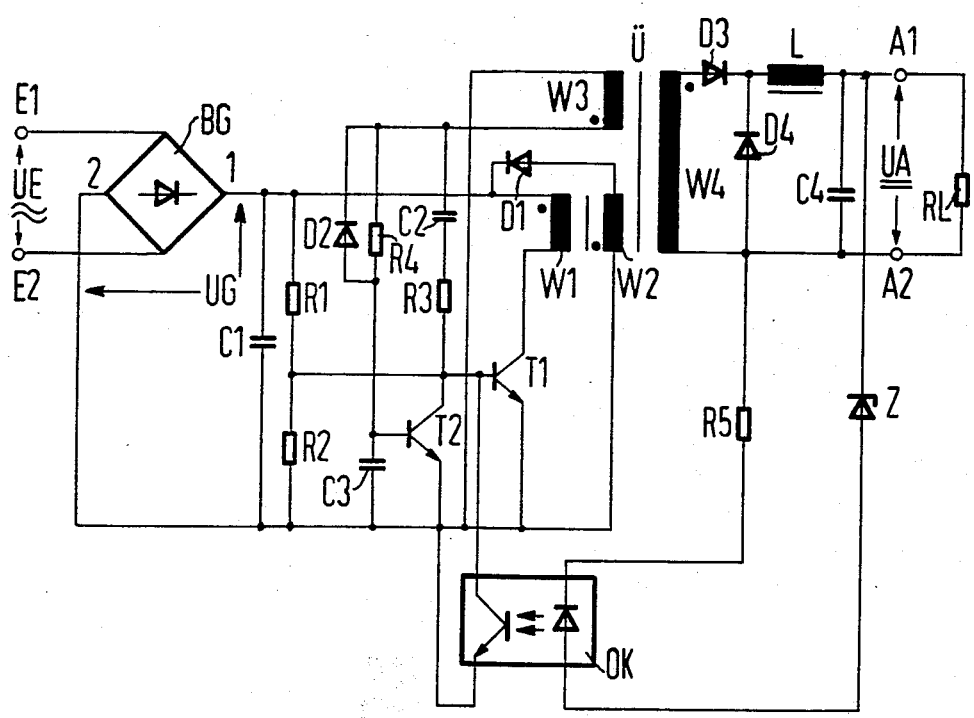

SWITCHED POWER SUPPLY COMPRISING A FREE-RUNNING FLOW CONVERTER AND ELECTRICALLY SEPARATED CONTROL LOOP

RELATED APPLICATIONS

This application is related to the following application of the same assignee: "Switched Power Supply Comprising A Free-Running FLow Transformer Without Control Loop", Stasch, Case No. P-85,715.

BACKGROUND OF THE INVENTION

The invention relates to a switched power supply having a rectifier arrangement for generating a DC voltage from an input AC voltage, and comprising a converter arrangement having a switching transistor and a transformer.

Switched power supplies are presently employed to a great degree for power supply systems, since they are lighter and smaller and cheaper to manufacture in comparison to 50 Hz power supplies.

Universally known switched power supplies comprise a transformer whose primary-side winding is charged with energy by means of a switching transistor and at whose secondary-side winding or windings this energy is taken in the form of one or more constant voltages. The transformer is a component of a flow transformer or of a blocking oscillator. The structure and functioning of these transformer types are extensively described in the book "Schaltnetzteile" by Joachim Wustehube, 1979, Expert-Verlag, Chapter 2.1, incorporated herein by reference.

Switched power supplies usually work in a frequency range from 16 to 500 kHz. Since the occurring current or voltage curves have large overshooting components and, moreover, high currents and voltages must be switched, one must still count on considerable disruptions in the frequency range above 70 Hz (long wave). There are binding regulations for the frequency response of these disruptions insofar as a propagation in public networks or a broadcast into open space are possible. For the suppression of asymmetrical noise voltages in the network, transformers in switched power supplies have a shielding between the primary and the secondary side. The shielding is composed, for example, of a copper foil which is placed over the primary winding in insulated fashion.

Blocking oscillator power supplies comprise a transformer with an air gap. Particularly given high powers, high eddy current losses arise in the transformer cores of the transformers and in the shielding. It is therefore generally standard (see, for example Wustehube) to employ a so-called conductive fleece for the shielding instead of the copper foil. The manufacture of such a transformer for a blocking oscillator is therefore involved and expensive.

Known flow transformers comprise essentially fixed-clock-controlled, periodically functioning switching transistors as well as a transformer without air gap whose primary winding lies in the collector circuit of the switching transistor and at whose secondary winding a DC voltage can be tapped via a rectifier arrangement. Since a prescribed sampling frequency is used given this circuit principle, the point in time of the cut-in of the switching transistor is predetermined. This circuit principle has the disadvantage that the switching transistor is switched on under power and a free-wheeling diode in the secondary circuit switches into the inhibited condition under power. This leads to high radio interference voltages on the network line. When these converter circuits are utilized in text terminal equipment of communication technology with electrical separation according to protective class 2, i.e. are used without a grounded conductor, then these devices cannot be radio-shielded to the required radio interference level of the limit value class B.

It is known in switched power supplies for maintaining the output voltage at the secondary side for regulating the ratio of on time to off time or, respectively, the ratio of on time to the sum of on time and off time, i.e. to regulate the so-called pulse duty factor for the switching transistor.

SUMMARY OF THE INVENTION

An object of the invention is to specifiy a switched power supply with electrical separation wherein only slight noise pulses appear on the connecting lines, which comprises a transformer with low eddy current losses, and which emits a regulated output voltage.

This object is achieved in accordance with the invention by providing the converter arrangement as a free-wheeling flow converter wherein the switching transistor is switched on in a current-free condition. A control stage at a secondary side is provided with an electrically separated control loop. The control stage detects a deviation of an output DC voltage from a prescribed value and sets a pulse duty factor for the switching transistor via the control loop.

One advantage of the switched power supply of the invention is that the free-running flow converter causes a triangular collector current in the switching transistor, whereby the converter is easily radio-shielded.

An output voltage regulation without a control loop is possible due to the switching regulator positioned at the secondary side.

The switching losses are reduced since the switching transistor is not switched on under power.

A metal foil which is easy to process can be employed for shielding the primary winding of the transistor since the switched power supply of the invention comprises a flow converter.

The employment of an opto-coupler is particularly advantageous for the realization of an electrically separated control loop via which the pulse duty factor for the switching transistor is regulated for maintaining a constant output DC voltage.

BRIEF DESCRIPTION OF THE DRAWING

The drawing FIGURE illustrates a switched power supply according to the invention.

DESCRIPTION OF THE PREFERRED EMBODIMENTS

The switched power supply shown in the drawing comprises a flow transformer having two input terminals E1, E2 at which an input alternating voltage UE is present. A bridge rectifier BG converts this input AC voltage UE into a DC voltage UG and emits this to two terminals 1, 2, whereby a potential which is positive with respect to terminal 2 is output at the terminal 1. The DC voltage UG is smoothed by a capacitor C1 connected between the terminals 1 and 2. Also, connected between the terminals 1 and 2 are a series connection of two resistors R1, R2 and the series connection composed of a primary winding W1 and the collector-emitter segment of a switching transistor T1. A voltage divider point (not referenced in detail) between the resistors R1 and R2 is connected to the base of the switching transistor T1.

The primary winding W1, a de-magnetization winding W2, a control winding W3, and a secondary winding W4 are component parts of a transformer U. The primary winding W1 and the secondary winding W4 respectively exhibit the same winding sense. The control winding W3 and the de-magnetization winding W2 exhibit the opposite winding sense. The de-magnetization winding W2 is connected in a series connection with a diode D1 between the two terminals 1 and 2, whereby the cathode of the diode D1 is connected to the terminal 1.

The collector-emitter segment of a control transistor T2 as well as the collector-emitter segment of the photo transistor of an opto-coupler OK are connected between the base of the switching transistor T1 and the terminal 2. The base of the control transistor T2 is connected to the terminal 2 via a capacitor C3 and via the series connection of resistor R4 and the control winding W3. The resistor R4 has a diode D2 connected parallel to its whose anode is connected to the base of the control transistor T2. The cathode of the diode D2 is connected to the base of the switching transistor T1 via the series connection of a capacitor C2 and a resistor R3.

Together with the capacitor C2, the resistor R3 forms a turn-on stage, and the capacitor C3 together with the resistor R4 and the control transistor T2 as well as the diode D3 forms a turn-off stage for the switching transistor T1.

The one end of the secondary winding W4 is connected to an output terminal A1 via a rectifier diode D3 and an inductance L. The other end of the secondary winding W4 is directly connected to an output terminal A2 which is connected to the cathode of the rectifier diode D3 via a free-wheeling diode D4 polarized in the conducting direction. A capacitor C4 is connected between the output terminals A1, A2 for smoothing an output DC voltage UA obtainable at the output terminals A1, A2. Also connected between the output terminals A1 and A2 are a load resistor RL which symbolically represents an external user as well as a Zener diode Z polarized in a reverse direction, the light-emitting diode of the opto-coupler OK polarized in the conducting direction, and a resistor R5.

The functioning of the switched power supply of the invention shall be described below.

The rectified input AC voltage UE, i.e. the DC voltage UG, is converted into a clocked voltage with the primary winding W1 of the transformer U and with the switching transistor T1. When the switching power supply is switched on, the capacitor C2 is charged via the resistors R1 and R3 via the control winding W3. When the threshold voltage is reached at the base of the switching transistor T1, this is switched on and the flow converter begins to work.

During the conductive phase of the switching transistor T1, energy is transmitted onto the secondary side of the transformer U. At the same time, the rectifier diode D3 is conductive and the free-wheeling diode D4 is inhibited. A current flowing through the inductance L enables the output DC voltage UA to be obtained at the capacitor C4. While the current is flowing, it is not only the load resistor RL which absorbs energy but, rather, the inductance L also absorbs energy, storing this energy as magnetic energy. The peak value of the current in the primary circuit is defined by the inductance L, by the sum of the loss resistances in the primary and secondary circuit, by the on-duration of the switching transistor T1, and by the value of the output DC voltage UL.

Likewise during the conductive phase of the switching transistor T1, the capacitor C3 at the primary side of the transformer U is charged via the resistor R4 by the current induced in the control winding W3. The conductive phase of the switching transistor T1 is concluded by two switch events. On the one hand, after charging of the capacitor C3 to the threshold voltage of the base of the control transistor T2, this is switched conductive in pulse-like fashion and the switching transistor T1 inhibits. On the other hand, in order to observe a constant value of the output DC voltage UA which is essentially defined by the Zener diode Z, the phototransistor of the opto-coupler OK is switched conductive when this value is exceeded and the switching transistor T1 is inhibited.

The on-duration of the switching transistor T1 thus is essentially defined by the time constant formed by the resistor R4 and the capacitor C3, or is defined by the value of the output DC voltage UA. During the inhibit phase of the switching transistor T1, a voltage which is negative with respect to the potential tappable at the terminal 2 of the bridge rectifier BG is present at the base of this switching transistor T1. This voltage inversion at the base of the switching transistor T1 is caused by the inversion of the voltage tappable at the control winding W3. The inhibit event in the switching transistor is initiated via the control transistor T2 or via the phototransistor of the opto-coupler OK and is maintained via the control winding W3 during the de-magnetization.

During the inhibit phase of the switching transistor T1, the rectifier diode D3 is polarized in the reverse direction and, therefore, in current-less fashion at the secondary side of the transformer U. Due to the energy stored in the inductance L, the current flows through the inductor L, through the load resistor RL, and through the free-wheeling diode D4 which is now conductive, and continues to flow in the same direction.

During the inhibit phase of the switching transistor T1, the magnetization energy accepted by the transformer core of the transformer U during the conductive phase of the switching transistor T1 flows back into the voltage source, i.e. into the capacitor 1, as electrical current via the de-magnetization winding W2 and the diode D1. The switching transistor T1 is again switched conductive after the de-magnetization of the transformer U and in the current-free condition of the free-wheeling diode D4. The negative voltage at the base of the switching transistor T1 during the inhibit phase of the switching transistor T1 is removed after the de-magnetization. The capacitor C2 is again charged via the resistor R3 and the control winding W3, and the switching transistor T1 is again switched conductive. The diode D2 serves for the sudden discharge of the capacitor C3 at the beginning of the inhibit phase of the switching transistor T1.

The idea underlying the switched power supply according to the invention is that the turn-on time of the switching transistor T1, and thus its switching frequency, are not rigidly prescribed. The switching transistor T1 is automatically switched on again after the de-magnetization of the transformer U and in the current-free condition of the free-wheeling diode D4. It is thus guaranteed that the switching transistor T1 is not switched on under power and that a triangular collector current flows in the primary circuit which is easily shieldable against radio frequency currents.

In the switched power supply of the invention, the switching transistor T1 is switched conductive for a time which is defined by the value of the output DC voltage UA, i.e. the pulse duty factor for the switching transistor T1 is regulated in accordance with the value of the output DC voltage UA. The maximum value of the on-duration of the switching transistor T1 is prescribed by the resistor R4 and the capacitor C3.

The transformer U is de-magnetized after this on-duration, i.e. during the inhibit phase of the switching transistor T1. The switching transistor T1 is again switched on after the de-magnetization and, therefore, in the current-free condition of the free-wheeling diode D4. The end of the de-magnetization is essentially recognized via the control winding W3.

Any controllable semiconductor switch element is employable as switching transistor T1 in the switched power supply of the invention.

The opto-coupler OK in the switched power supply of the invention serves for the realization of an electrically separated control loop between the primary and secondary side. Transformers or piezo ceramics can also be employed instead.

Although various minor changes and modifications might be proposed by those skilled in the art, it will be understood that we wish to include within the claims of the patent warranted hereon all such changes and modifications as reasonably come within our contribution to the art.

We claim as our invention:

1. A switched power supply, comprising:
   a rectifier means for generating a DC voltage from an input AC voltage;
   a converter means connected to the DC voltage and having a transformer with a primary winding and secondary winding and a switching transistor connected to the primary winding;
   the converter means comprising a free-wheeling flow converter and having switching control means for switching the switching transistor on in a current-free condition and a free-wheeling diode connected to the secondary winding together with a storage inductor;
   the transformer having a demagnetization winding connected by a diode to the primary winding;
   a control means at a secondary winding side of the free-wheeling flow converter having an electrically separated control loop connected to the switching control means for determining a deviation of an output DC voltage from a prescribed value and setting a pulse duty factor for the switching transistor via the control loop;
   the transformer having a control winding; and
   a turn-on means and a turn-off means connected to a control input of the switching transistor, the turn-on means switching the switching transistor conductive given a demagnetized transformer, and the turn-off means inhibiting the switching transistor after a given on-duration.

2. A switched power supply, comprising:
   a rectifier means for generating a DC voltage from an input AC voltage;
   a converter means connected to the DC voltage and having a transformer with a primary winding and secondary winding and a switching transistor connected to the primary winding;
   the converter means comprising a free-wheeling flow converter and having a switching control means for switching the switching transistor on in a current-free condition and a free-wheeling diode connected to the secondary winding together with a storage inductor;
   the transformer having a demagnetization winding connected by a diode to the primary winding;
   a control means at a secondary winding side of the free-wheeling flow converter having an electrically separated control loop connected to the switching control means for determining a deviation of an output DC voltage from a prescribed value and setting a pulse duty factor for the switching transistor via the control loop;
   means connected to the DC voltage derived from the AC voltage so as to provide a portion of the DC voltage at a base of the switching transistor;
   the transformer having a control winding;
   a turn-on means and a turn-off means connected to a control input of the switching transistor; and
   the turn-on means switching the switching transistor conductive via the control winding given a demagnetized transformer, and the turn-off means inhibiting the switching transistor after a prescribable on-duration by a current induced in the control winding.

3. A switched power supply according to claim 1 wherein the secondary winding side of the converter comprises a rectifier diode, said free-wheeling diode and said storage inductance, and a capacitor, the capacitor being connected across said output DC voltage to smooth the output DC voltage, the rectifier diode together with the inductance being connected to the secondary winding side so as to generate the output DC voltage, and the free-wheeling diode being connected to the inductance so as to maintain the output DC voltage.

4. A switched power supply according to claim 1 wherein the control means comprises a Zener diode connected to the output DC voltage.

5. A switched power supply according to claim 4 wherein the control loop comprises an opto-coupler whose light-emitting diode is connected together with the Zener diode between output terminals of the converter and via whose phototransistor the switching transistor can be inhibited.

6. A switched power supply, comprising:
   a rectifier means for generating a DC voltage from an input AC voltage;
   a converter means connected to the DC voltage and having a transformer with a primary winding and secondary winding and a switching transistor connected to the primary winding;
   the converter means comprising a free-wheeling flow converter and having switching control means for switching the switching transistor on in a current-free condition;
   a control means at a secondary winding side of the free-wheeling flow converter having an electrically separated control loop connected to the switching control means for determining a deviation of an output DC voltage from a prescribed value and setting a pulse duty factor for the switching transistor via the control loop;

means connected to the DC voltage derived from the AC voltage so as to provide a portion of the DC voltage at a base of the switching transistor;

the transformer having a control winding;

a turn-on means and a turn-off means connected to a control input of the switching transistor;

the turn-on means switching the switching transistor conductive via the control winding given a demagnetized transformer, and the turn-off means inhibiting the switching transistor after a prescribable on-duration by a current induced in the control winding; and the turn-off means being formed of a control transistor connected to the control input of the switching transistor, of a capacitor and of a resistor connected to a control input of the control transistor, the resistor and capacitor values being selected so as to define the on-duration and the resistor connecting to the control winding.

7. A switched power supply according to claim 6 wherein a diode is connected parallel to the resistor, said diode being connected so it can suddenly discharge the capacitor at a beginning of the de-magnetization of the transformer.

8. A switched power supply, comprising:

a rectifier means for generating a DC voltage from an input AC voltage;

a converter means connected to the DC voltage and having a transformer with a primary winding and secondary winding and a switching transistor connected to the primary winding;

the converter means comprising a free-wheeling flow converter and having switching control means for switching the switching transistor on in a current-free condition;

a control means at a secondary winding side of the free-wheeling flow converter having an electrically separated control loop connected to the switching control means for determining a deviation of an output DC voltage from a prescribed value and setting a pulse duty factor for the switching transistor via the control loop;

means connected to the DC voltage derived from the AC voltage so as to provide a portion of the DC voltage at a base of the switching transistor;

the transformer having a control winding;

a turn-on means and a turn-off means connected to a control input of the switching transistor;

the turn-on means switching the switching transistor conductive via the control winding given a demagnetized transformer, and the turn-off means inhibiting the switching transistor, and the turn-off means inhibiting the switching transistor after a prescribable on-duration by a current induced in the control winding; and the turn-on means being formed of a resistor and a capacitor in series connected between the control winding and the control input of the switching transistor.

* * * * *